United States Patent [19]

Fukushi et al.

[11] Patent Number: 4,658,420
[45] Date of Patent: Apr. 14, 1987

[54] TONE RESPONSIBLE DISABLER CIRCUIT FOR AN ECHO CANCELLER

[75] Inventors: Yuzo Fukushi; Yukio Hagiwara, both of Tokyo, Japan

[73] Assignee: NEC Corporation, Japan

[21] Appl. No.: 676,531

[22] Filed: Nov. 30, 1984

[30] Foreign Application Priority Data

Dec. 6, 1983 [JP] Japan ................................ 58-229056

[51] Int. Cl.⁴ ............................................. H04B 3/20
[52] U.S. Cl. ..................................... 379/407; 379/410
[58] Field of Search ............ 179/170 A, 170 C, 170.2, 179/170.4, 170.6, 170.8, 175.31 E; 370/32

[56] References Cited

U.S. PATENT DOCUMENTS

| 3,069,501 | 12/1962 | Gilman et al. | 179/170.2 |
|---|---|---|---|
| 3,647,993 | 3/1972 | Foulkes et al. | 179/170.2 |
| 3,783,194 | 1/1974 | Vilips et al. | 179/170.2 X |
| 3,935,403 | 1/1976 | Penicaud et al. | 179/170.2 |
| 4,115,668 | 9/1978 | Skrovanek et al. | 179/170.2 |
| 4,177,361 | 12/1979 | Birck | 179/170.2 |
| 4,194,092 | 3/1980 | Luder | 179/170.4 X |
| 4,288,664 | 9/1981 | Araseki | 179/170.2 |
| 4,352,962 | 10/1982 | La Mothe | 179/170.2 |
| 4,469,916 | 9/1984 | de Bergh et al. | 179/170.2 |

OTHER PUBLICATIONS

The Post Office Electric Engineers' Journal vol. 63, Part 2/ Jul. 1970.

Primary Examiner—Gene Z. Rubinson
Assistant Examiner—Randall P. Myers
Attorney, Agent, or Firm—Laff, Whitesel, Conte & Saret

[57] ABSTRACT

A tone disabler is designed for use in a full duplex data transmission system adapted to send a tone before each transmission of data and to reverse the phase of such tone during a later half of a full duplex data transmission. Both the tone and the phase reversal are detected. Responsive to a coincidence of such detections, a control signal is given to disable an echo canceller. The control signal is fed back to latch the control signal as long as the tone is present.

7 Claims, 7 Drawing Figures

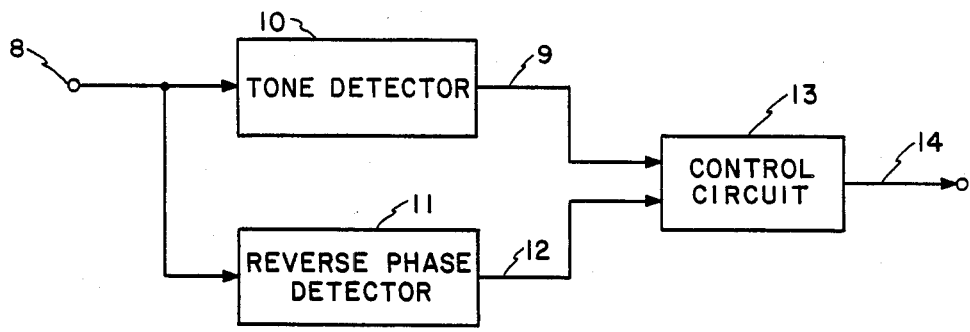
FIG. 1
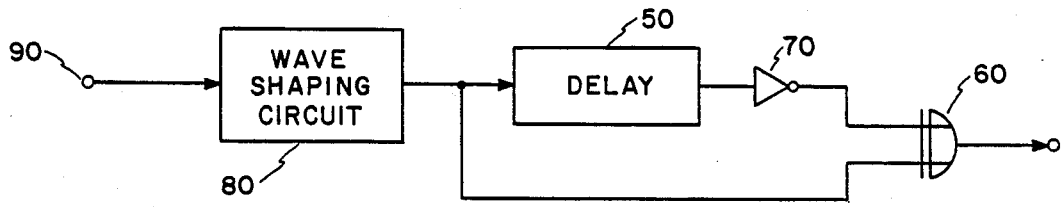
FIG. 2
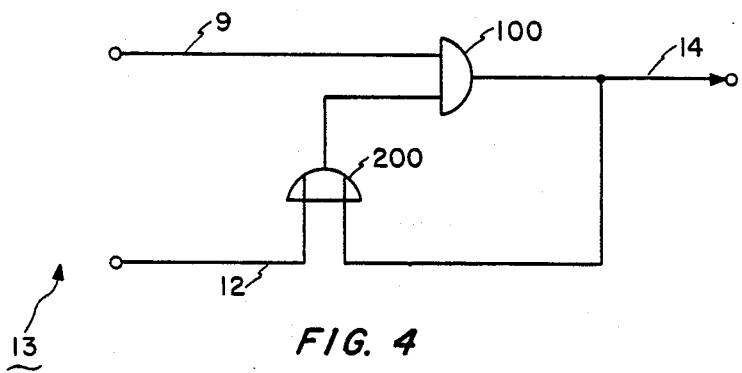
FIG. 4
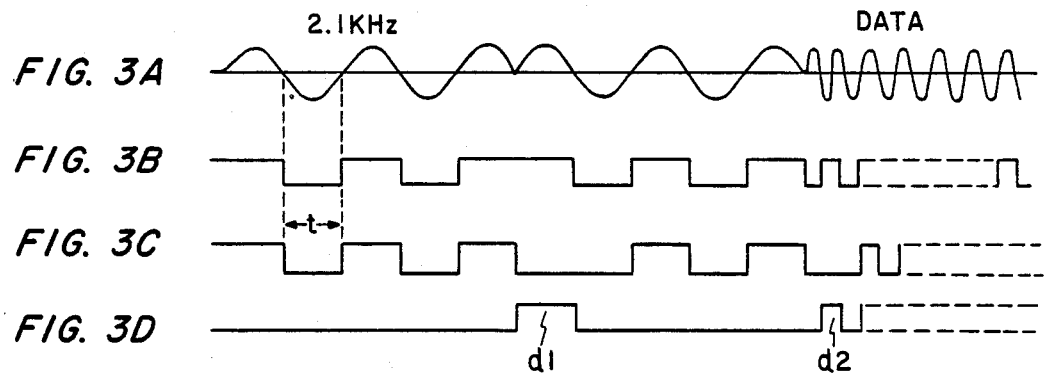

TONE RESPONSIBLE DISABLER CIRCUIT FOR AN ECHO CANCELLER

The present invention relates to a tone responsive disabler circuit for an echo canceller.

In order to eliminate undesirable echoes arising in a hybrid circuit for interconnecting a four-wire circuit and a two-wire circuit, an echo suppressor is commonly used on the four-wire circuit. The echo supressor, monitoring the signal level on the reception path, eliminates the echoes by forcibly inserting a large loss into the transmission path when the reception level is higher than the transmission level.

On the other hand, when the data transmission uses a modulator/demodulator (MODEM) through a four-wire circuit connected to such an echo suppressor, the operation of the echo suppressor deteriorates. The transmitted data, therefore, cannot be accurately detected at the receiving end. Because of this problem, a tone responsive disable control circuit is indispensable to detect a tone signal consisting of a specific frequency which is transmitted before the transmission of data from the MODEM to disable the echo suppressor.

Meanwhile, an echo canceller, inserted into a four-wire circuit in place of such an echo suppressor, cancels true echo signals with estimated echo signals which are prepared on the basis of received signals. The echo canceller normally operates in half duplex data communication, in which one MODEM does not transmit data during the transmission of the other MODEM. However, the echo canceller may destroy data in full duplex data communication in which the MODEMs on both sides simultaneously transmit, because the echo canceller cancels the estimated echo signal from the data.

For this reason, the International Telephone and Telegraph Consultative Committee (C.C.I.T.T.), has been studying a use of a reverse phase of the 2.1 kHz tone during the latter half of the tone signal. A detection of the reversed tone is used as information for disabling the echo canceller.

An object of the present invention is, therefore, to provide a tone responsive disabler circuit for an echo canceller matching the new type of tone signal, wherein a phase is reversed during the latter half of the full duplex data transmission.

According to an aspect of the present invention, a tone responsive disabler circuit has a first means for detecting a tone signal which is transmitted at the beginning of data transmission. Responsive thereto, a first detection signal is given to represent the presence of the tone signal. The first detection signal continues at least during the reception of data signals which are transmitted following the tone signal. A second means detects the phase change in the tone signal to produce a second detection signal representing the occurrence of the phase change. A third means operates responsive to the first and second detection signals to produce a third detection signal which continues from the start of the second detection signal until the end of the first detection signal.

Other features of the present invention will be more apparent from the detailed description hereunder when taken in conjunction with the accompanying drawings, wherein:

FIG. 1 is a block diagram of one preferred embodiment of the invention;

FIGS. 2 and 4 illustrate detailed portions of the invention; and

FIGS. 3A to 3D are waveform diagrams for describing the operation of the reverse phase detector shown in FIG. 2.

In the drawings, the same reference numerals represent respectively the same structural elements.

Referring to FIG. 1, an embodiment of the invention comprises a tone signal detector 10, a reverse phase detector 11, and a control circuit 13. The tone detector 10 detects a tone signal (for instance, 2.1 kHz) transmitted at the beginning of data transmission to produce a first detection signal which represents the presence of the tone signal. Detector 10 continues to produce the first detection signal at least as long as the data signals are transmitted, following the reception of the tone signal. For detailed information about the detector 11, reference may be made to a paper entitled "The Echo Suppressor No. 7A", published in Post Office Electrical Engineers' Journal, Vol. 63, Part, 2, July, 1970, pp. 36–91, particularly FIG. 7.

The reverse phase detector 11 detects the phase change in the tone signal and produces a second detection signal representing the occurrence of the phase reversal. The control circuit 13 responds to the first and second detection signals which are received by way of output lines 9 and 12. Over an output line 14, circuit 13 sends the third detection signal, which continues from the start of the second detection signal until the end of the first detection signal.

Referring now to FIG. 2, the detector 11 comprises a wave shaping circuit 80 for converting the received tone signal into a rectangular wave. A delay circuit 50 and an inverter 70 invert the output of the delay circuit 50. An exclusive-OR (EXOR) circuit 60 achieves the EXOR operation responsive to the output of the inverter 70 and the rectangular wave.

FIGS. 3A to 3D illustrate the operation of the detector 11 shown in FIG. 2. The 2.1 kHz tone signal has a phase reversal and data signals (FIG. 3A) are supplied to a terminal 90 (FIG. 2). The tone signal is wave-shaped by the wave shaping circuit 80 (FIG. 3B), and fed to the delay circuit 50 and to one of the input terminals of the EXOR circuit 60.

The wave-shaped signal is delayed by the delay circuit 50 for a prescribed length of time t, and then is supplied via the inverter 70 to the other input terminal of the EXOR circuit 60 (FIG. 3C). The delay time t of the delay circuit 50 is, for instance, ½ of the cycle of the 2.1 kHz tone signal. The EXOR circuit 60 gives an EXOR operation responsive to the output of the inverter 70 and of the wave shaping circuit 80 (FIG. 3D). In FIG. 3D, a signal d1 is the second detection signal which is supplied from the reverse phase detector 11 and which representes the occurrence of the phase reversal. As shown in FIG. 3D, after the detection signal d1, a signal d2 appears corresponding to data signals, but it in no way affects the operation of the control circuit 13, which provides the correct third detection signal over the output line 14.

Referring now to FIG. 4, the control circuit 13 is composed of an OR gate 200 for combining the output of the control circuit 13 with the reverse phase signal 12 of detector 11. An AND gate 100 combines the output of OR gate 200 and the first detection signal produced by tone detector 10. The first detection signal from the tone detector 10 is led via the line 9 to a first input terminal of the AND gate 100. The second detection signal from the reverse phase detector 11 is led via the line 12 to a first input terminal of the OR gate 200. The output signal of the OR gate 200 is led to a second input terminal of the AND gate 100. The output signal of the AND gate 100 is led to a second input terminal of the OR gate 200. The output of the AND gate 100 is the third detection signal.

The control circuit 13 provides the third detection signal on the line 14 (FIG. 4), upon the appearances of the first detection signal on the line 9 and the second detection signal on the line 12. Once the third detection signal is supplied on the line 14, even if the second detection signal on the line 12 disappears, the third detection signal continues as long as the first detection signal is retained on the line 9.

As hitherto described, the inventive tone responsive disabler circuit detects a prescribed tone signal which is transmitted at the beginning of data transmission the phase of the tone signal is reversed halfway, to disable an echo canceller.

Various modifications and alternatives to the embodiment mentioned above can be easily made within the scope of the invention defined by the appended claims.

What is claimed is:

1. A tone responsive disabler circuit for disabling an echo canceller by detecting a tone signal of a prescribed frequency which includes a phase reversal signal portion and is sent out prior to data transmission, said tone responsive disabler circuit comprising first means for detecting said first tone signal to produce a first detection signal representing the presence of said tone signal, said first means continuing to produce said first detection signal during at least the reception of data signals transmitted following said tone signal; second means for detecting said phase reversal signal portion in said tone signal to produce a second detection signal representing the occurrence of the phase reversal signal portion; and third means responsive to said first and second detection signal for producing a third detection signal which continues from the start of said second detection signal until the end of said first detection signal.

2. A tone responsive disabler circuit as claimed in claim 1, wherein said third means comprises an OR gate for responding to said second or third detection signal, and an AND gate responsive to a coincidence of said first detection signal and an output of said OR gate for producing said third detection signal.

3. A tone responsive disabler circuit for disabling an echo canceller in a full duplex data transmission system adapted to send a tone signal before each transmission of data and to reverse the phase of said tone signal during a latter half of the tone signal, said tone responsive disabler circuit comprising first means for detecting said tone signal to produce a first detection signal, second means for detecting a reversal of the phase of said tone signal to produce a second detection signal, third means responsive to said first and second detection signals and a latching signal which continues as long as said first detection signal is present for producing a control signal, and fourth means responsive to said control signal for feeding back said latching signal to said third means.

4. The tone responsive disabler circuit of claim 3 wherein said third means comprises a two input AND gate, one input of said AND gate being coupled to said means for detecting said tone signal and the other input of said AND gate being coupled to the output of an OR gate, said OR gate having a first input coupled to the means for detecting the phase reversal and housing a second input coupled to the output of said AND gate, wherein the fourth means comprises the coupling between the output of said AND gate and the second input of said OR gate.

5. The tone responsive disabler circuit of claim 4 wherein said second means comprises a series circuit of a delay circuit, an inverter and an exclusive OR circuit, and a bypass for said series circuit connecting the input of said delay circuit directly to said exclusive OR circuit.

6. The tone responsive disabler circuit of claim 3 wherein said second means for detecting the phase reversal comprises a series circuit of a delay circuit, an inverter and an exclusive OR circuit, and a bypass for said series circuit connecting the input of said delay circuit directly to said exclusive OR circuit.

7. The tone responsive disabler circuit of claim 6 wherein said delay circuit delays signals input thereto for a time period which is equal to one half of a cycle of said tone signal.

* * * * *